US010917314B1

(12) United States Patent
Iyer

(10) Patent No.: US 10,917,314 B1
(45) Date of Patent: Feb. 9, 2021

(54) DISTRIBUTED HEALTH MANAGEMENT USING PEER LEASES

(71) Applicant: Amazon Technologies, Inc., Seattle, WA (US)

(72) Inventor: Rakesh Narayan Iyer, San Jose, CA (US)

(73) Assignee: Amazon Technologies, Inc., Seattle, WA (US)

(*) Notice: Subject to any disclaimer, the term of this patent is extended or adjusted under 35 U.S.C. 154(b) by 53 days.

(21) Appl. No.: 16/058,875

(22) Filed: Aug. 8, 2018

(51) Int. Cl.
*H04L 12/24* (2006.01)
*H04L 29/08* (2006.01)
*H04L 12/26* (2006.01)

(52) U.S. Cl.
CPC ...... *H04L 41/5025* (2013.01); *H04L 43/0811* (2013.01); *H04L 43/0823* (2013.01); *H04L 67/1034* (2013.01)

(58) Field of Classification Search
CPC ............. H04L 67/1004; H04L 67/1008; H04L 67/1031; H04L 67/1034; H04L 41/5025; H04L 43/0811; H04L 43/0823
See application file for complete search history.

(56) References Cited

U.S. PATENT DOCUMENTS

| 5,333,269 A | * | 7/1994 | Calvignac | G06F 15/167 709/215 |
| 2003/0217241 A1 | * | 11/2003 | Chong, Jr. | G06F 9/526 711/163 |
| 2004/0243709 A1 | * | 12/2004 | Kalyanavarathan | G06F 9/5033 709/226 |
| 2005/0055446 A1 | * | 3/2005 | Chidambaran | G06F 9/5088 709/226 |
| 2009/0271412 A1 | * | 10/2009 | Lacapra | H04L 67/104 |
| 2019/0035012 A1 | * | 1/2019 | Kludy | G06Q 30/0645 |

* cited by examiner

*Primary Examiner* — Ranodhi Serrao
(74) *Attorney, Agent, or Firm* — Nicholson De Vos Webster & Elliott LLP

(57) ABSTRACT

Techniques for distributed node management are described. In some implementations, distributed node management includes determining a host of a distributed system to be unhealthy; requesting a plurality of leases from peers in the distributed system, each lease to guarantee the lease providing peer will not undergo voluntary maintenance; upon receiving the requested plurality of leases, reporting the host as unhealthy to a load balancer of the distributed system, the load balancer to balance traffic of the host and not direct traffic to the unhealthy host; and reporting the host as healthy to the load balancer of the distributed system after a predetermined period of time.

13 Claims, 11 Drawing Sheets

DISTRIBUTED HEALTH MANAGEMENT USING PEER LEASES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for distributed management using peer leases are described.

Management of hosts in a large scale distributed system involves removing hosts from the traffic path. The removal may be due to maintenance or when a host is not able to meet a service level agreement (SLA). The SLA may not be met due to a number of factors including, but not limited to high error rate, connectivity issues, or latency.

Current approaches to management of hosts in a large scale distributed system utilize a centralized manager to control the hosts to be maintained and thus limit the outage. Unfortunately, centralized management may introduce bottlenecks and/or maintenance issues of its own. Detailed herein are embodiments of host management using peer leases. Each peer lease is a time-based guarantee to a host that the lease giving peer will not undergo voluntary maintenance. Peer leases guarantee limited outage for planned or unplanned maintenance.

Hosts undergoing maintenance will ask for leases from a limited (for example, 10) number of peer hosts. Each node (peer or host) keeps account of leases it has given out and will give out a limited number of leases (for example, 3) at a time. In some embodiments, leases expire which allows peers to automatically be freed of its commitment. Further, when a peer needs to undergo an event (such as maintenance), in some embodiments a peer will reject lease requests. Requiring a certain number of leases and limiting number of leases given by a host bounds an amount of outage to a desired limit without any centralized agent.

Figure 1:
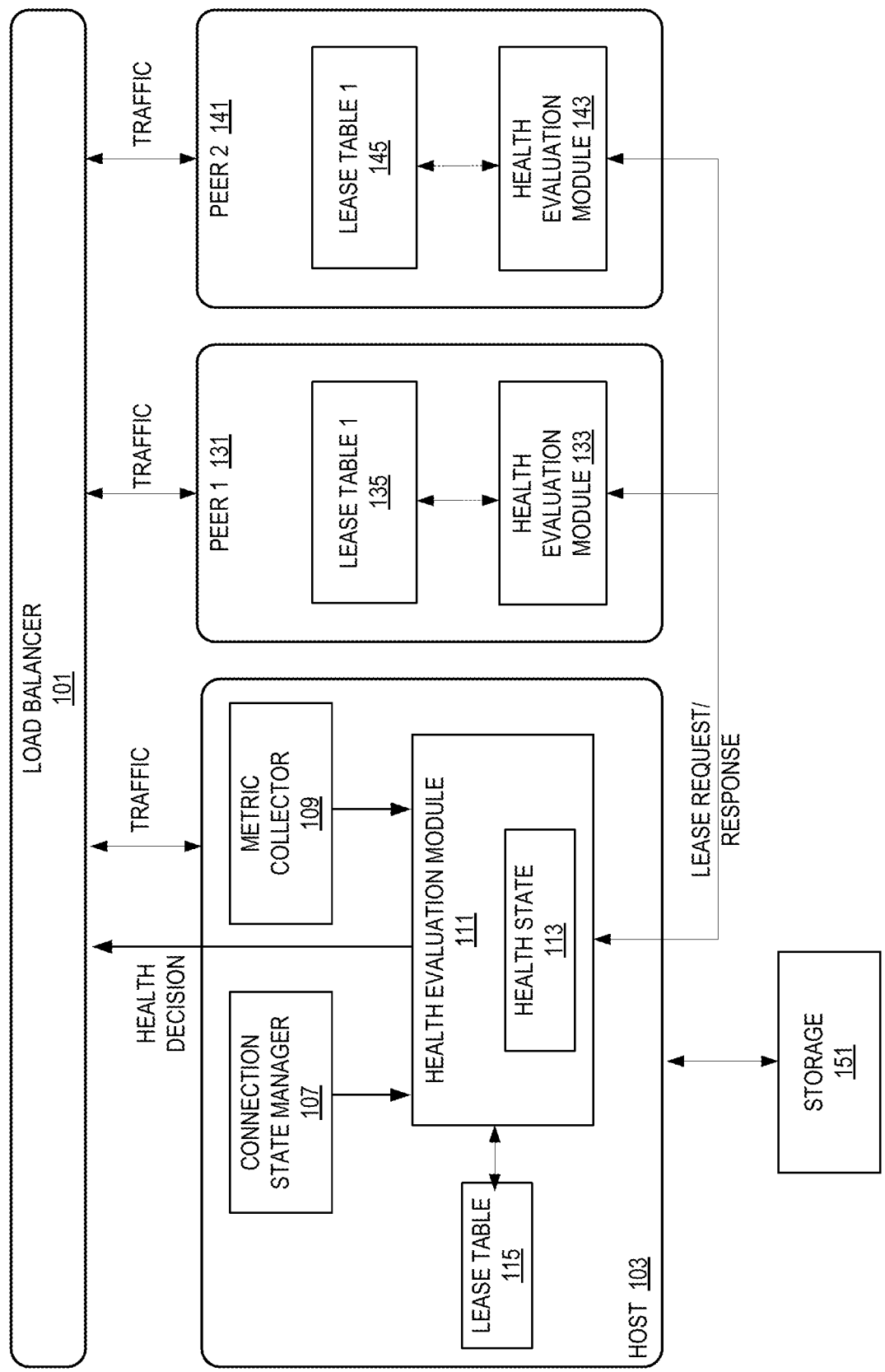
FIG. 1 illustrates embodiments of a distributed system that utilizes peer leases.

FIG. 1 illustrates embodiments of a distributed system that utilizes peer leases. A load balancer 101 directs traffic to nodes 103, 131, and 141. For example, an application may be split across nodes (such as host 103 and peer 131) and the load balancer 101 routes traffic to these nodes according to capability, network congestion, etc.

In this illustration, host 103, peer 1 131, and peer 2 141 are separate devices. The separation may be physical and/or logical. While not shown, each of the nodes 103, 131, and 141 includes a memory to store the software modules and tables shown and a processor to execute the software modules.

In this illustration, host 103 is the device that is requesting a lease from one or more of peer 1 131 and peer 2 141. Within the host 103 are several modules. A connection state manager 107 tracks the connections of the host 103. For example, connections to storage 151, peers 131 and 141, and the load balancer 101 are tracked. In some embodiments, the connections are tracked based on one or more of an amount of time disconnected (or connected), a connection speed, etc.

A metric collector 109 collects information about errors and/or latency involving the host 103. In some embodiments, the metric collector 109 tracks the number of errors generated by the host, information regarding failures of requests (such as time outs) the host is to service, etc. In some embodiments, the metric collector 109 collects latency information regarding how long it took the host 103 to respond to a request.

Health evaluation module 111 receives information from the connection state manager 107 and metric collector 109 to determine a health state 113. Having a high amount of failures, slow response times, and/or poor connections may indicate an unhealthy host 103. Conversely, a fully connected and responsive host 103 should be considered healthy. The health evaluation module 111 includes a heuristic machine learning model to determine a health state 113 in some embodiments.

The health evaluation module 111 is also responsible for responding to lease requests and stopping the host 103 from performing voluntary maintenance when it has given out leases. As such, the health evaluation module 111 couples to, or includes, a lease table 115 which stores, per lease, a lessee and end time for the lease. An embodiment of a state machine maintained by health evaluation module 111 is described with respect to FIG. 5.

The health evaluation module 111 communicates with health evaluation modules 133 of peer 1 131 and 143 of peer 2 141. Each of these health evaluation modules 133 and 143 have the same functionality as health evaluation module 111 and couple to, or include, lease tables 135 and 145 of their own. While not shown, peer 1 131 and peer 2 141 also include a connection state manager 107 and a metric collector 109.

Figure 2:
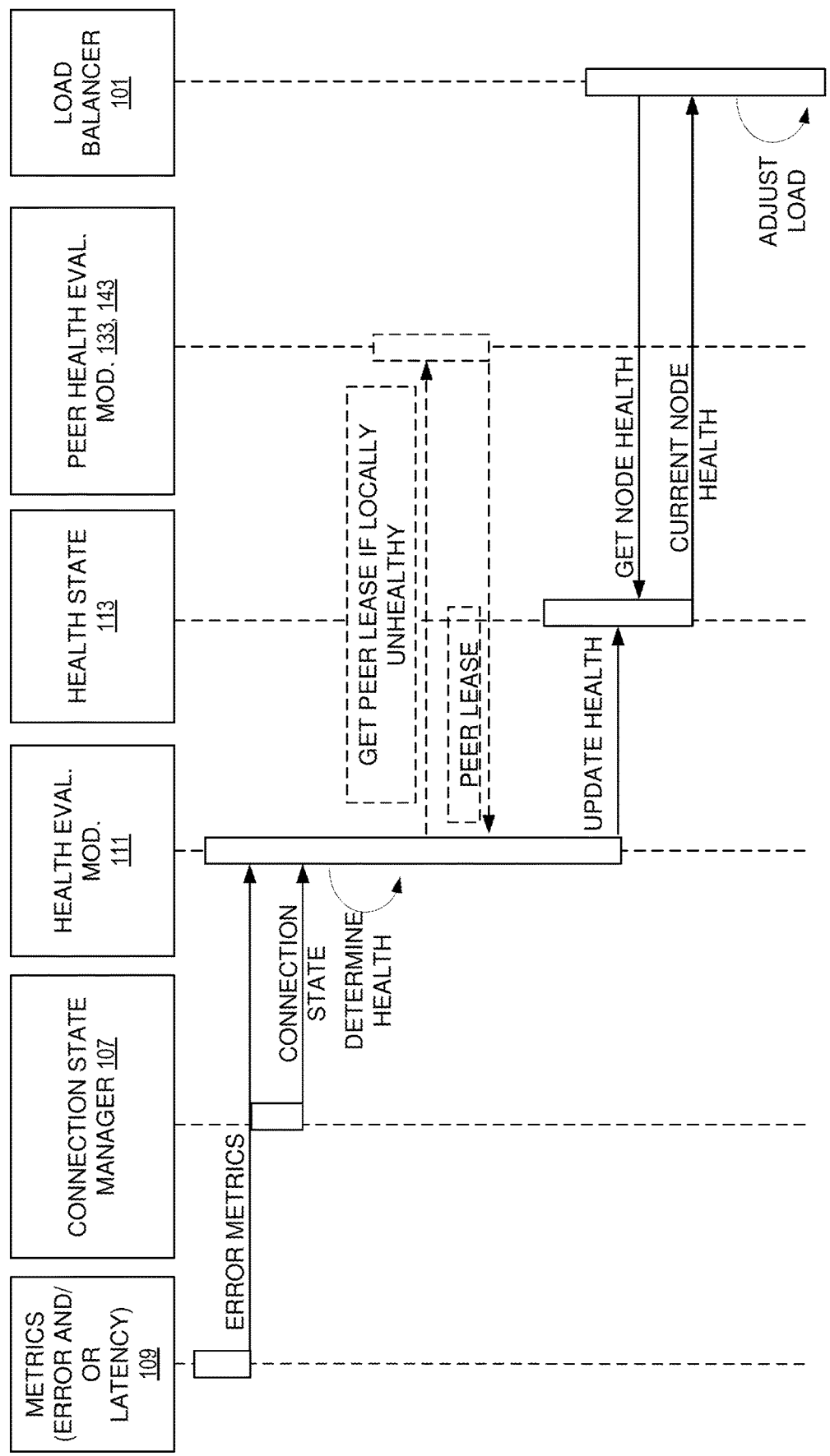
FIG. 2 illustrates embodiments of a swim diagram detailing actions between a host, one or more peers, and a load balancer.

FIG. 2 illustrates embodiments of a swim diagram detailing actions between a host, one or more peers, and a load balancer. In this illustration, components use the same labels as FIG. 1. As such, the metric collector 109, the connection state manager 107, the health evaluation module 111, and the health state 113 are all a part of the host 103 that desires leases.

The metric collector 109 provides error metrics to the health evaluation module 111, and the connection state manager 107 provides connection state information to the health evaluation module 111. The health evaluation module 111 determines the health of the host 103. Depending upon the determined health, the health evaluation module 111 may ask for peer leases via peer health evaluation modules 133 and 143. The peer health evaluation modules 133 and 143 send back peer leases if they are able. Again, an example of a state machine for peer leasing is described with respect to FIG. 5.

The health evaluation module 111 updates its health state 113 which requested by, and provided to, the load balancer 101 to use in load adjustments. For example, hosts marked as "unhealthy" will be load balanced to not receive traffic.

Figure 3:
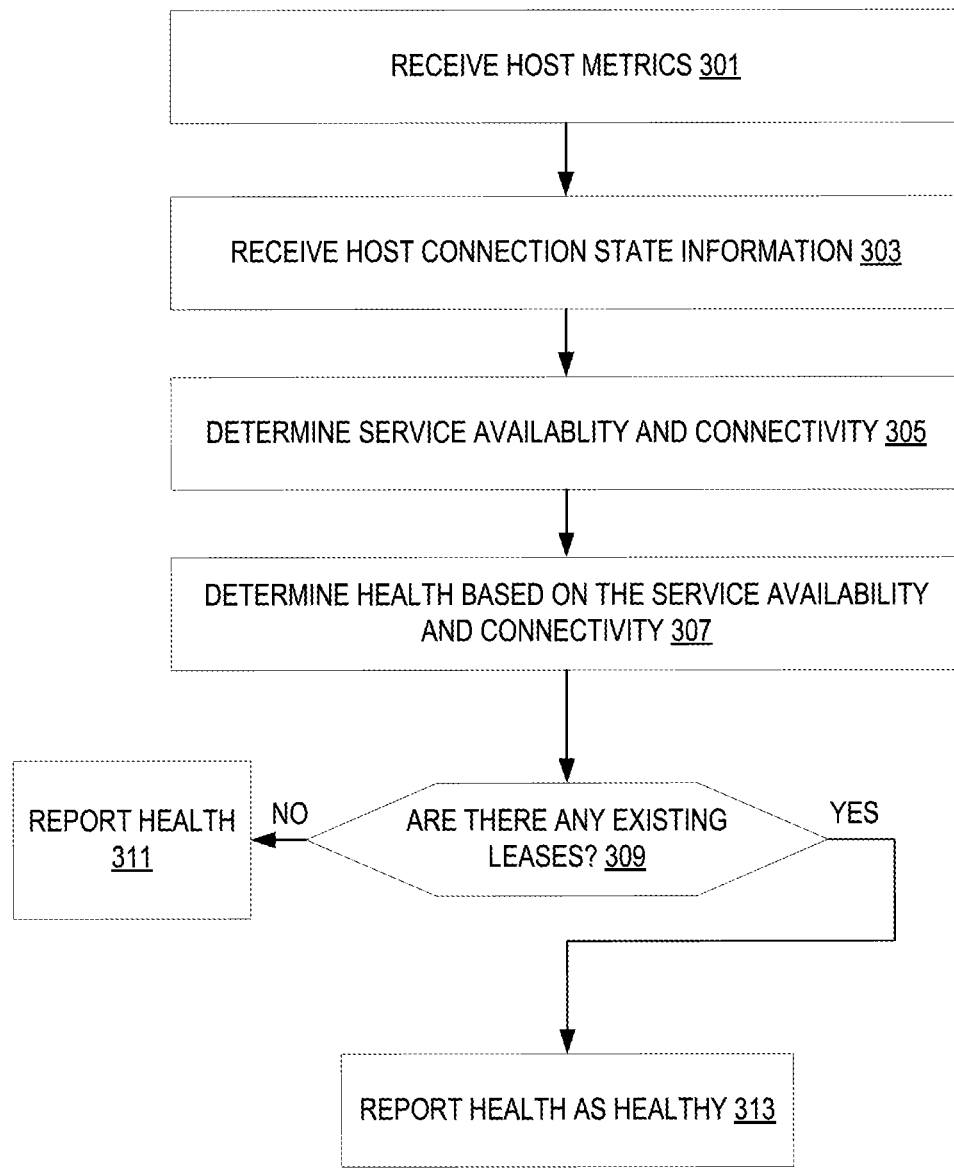
FIG. 3 illustrates embodiments of a method performed by a host.

FIG. 3 illustrates embodiments of a method performed by a host. In particular, in some embodiments, the method is performed by a host evaluation module. At 301, host metrics such error and/or latency metrics are received. Examples of such metrics have been detailed.

Host connection state information, such as that detailed earlier, are received at 303. For example, if the host is connected to all of the external devices it should be, a degradation of traffic rate between the host and a device, etc. are received.

A determination of service availability and connectivity is made at 305 based upon the received metrics and connection state information. For example, raw error information may be used to determine service availability and connectivity state with external devices is used to determine the host's connectivity. In some embodiments, the determination of service availability and connectivity is made with respect to a SLA.

A health status is determined based on the service availability and connectivity at 307. For example, in some embodiments, if either service availability and connectivity is below a threshold then the host is considered "unhealthy." In some embodiments, if one of service availability and connectivity is below a threshold then the host is considered "unhealthy." When the host is not "unhealthy," it is considered "healthy."

At 309, a determination of if the host has given any leases that have not expired is made. For example, does the lease table indicate at least one lease is still in play? In some embodiments, all leases have the same expiration time and only the newest lease needs to be checked. In other embodiments, requests for leases include an amount of time to keep the lease.

At 311, when there are no existing leases, the health status as determined is set in some embodiments. However, in some embodiments, when the determined health status is unhealthy the marked health status may still be healthy as shown in FIG. 4.

When there are existing leases, then the host will mark its health status as healthy for a load balancer to see at 313.

Figure 4:
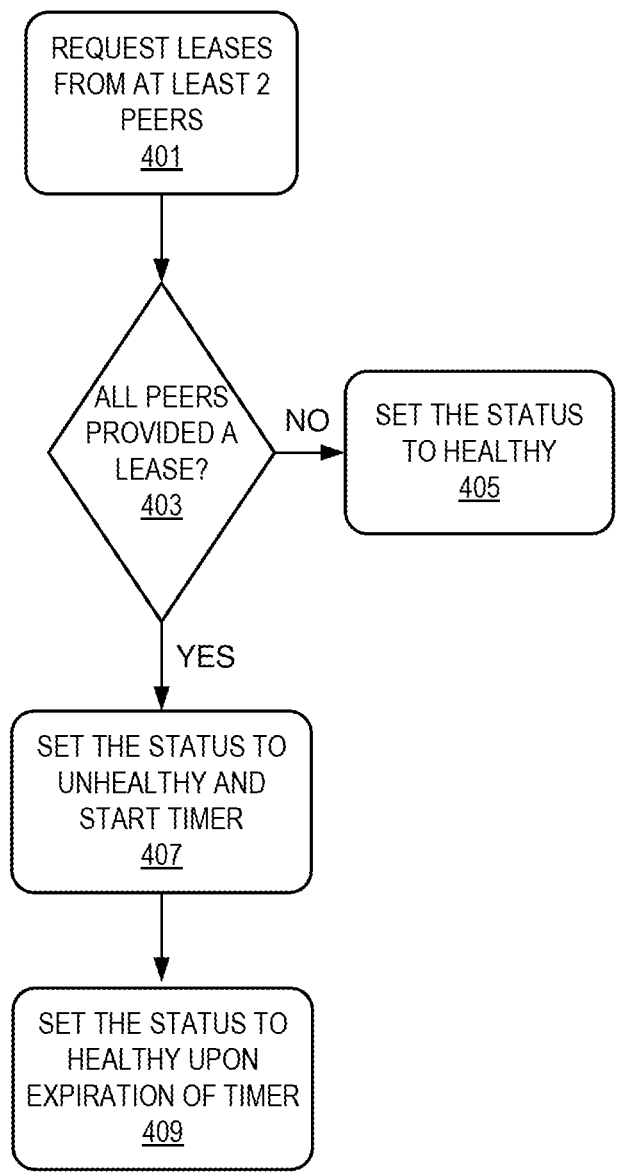
FIG. 4 illustrates embodiments of a method performed by a host.

FIG. 4 illustrates embodiments of a method performed by a host. In particular, in some embodiments, the method is performed by a host evaluation module after it has determined the host is "unhealthy." At 401, a request for leases from at least 2 peers is made. In some embodiments, these peers are selected at random. In some embodiments, at least a majority of peers are asked for a lease. Depending upon the implementation, the request for a lease may include an amount of time for the lease to be active. In some implementations, the amount of time to be active is preset and may include a skew.

A determination of if all of the requested peers have provided a lease is made at 403. Peers may have valid reasons for not providing a lease such as wanting to perform maintenance or having given out too many leases. For some embodiments, a lease is to be denied when a number of leases granted by a peer exceeds a threshold over a period of time. Or, a peer may not have received a lease. Regardless, not receiving a lease may be indicative of larger issues within the system.

When all of the requested peers have not provided a lease, the status of the host is set to healthy at 405.

When all of the requested peers have provided a lease, then the status of the host is set to unhealthy and a timer for keeping that status is set at 407. For example, a timer of 5 minutes is set.

Upon expiration of the timer, the status is set to healthy at 409.

Figure 5:
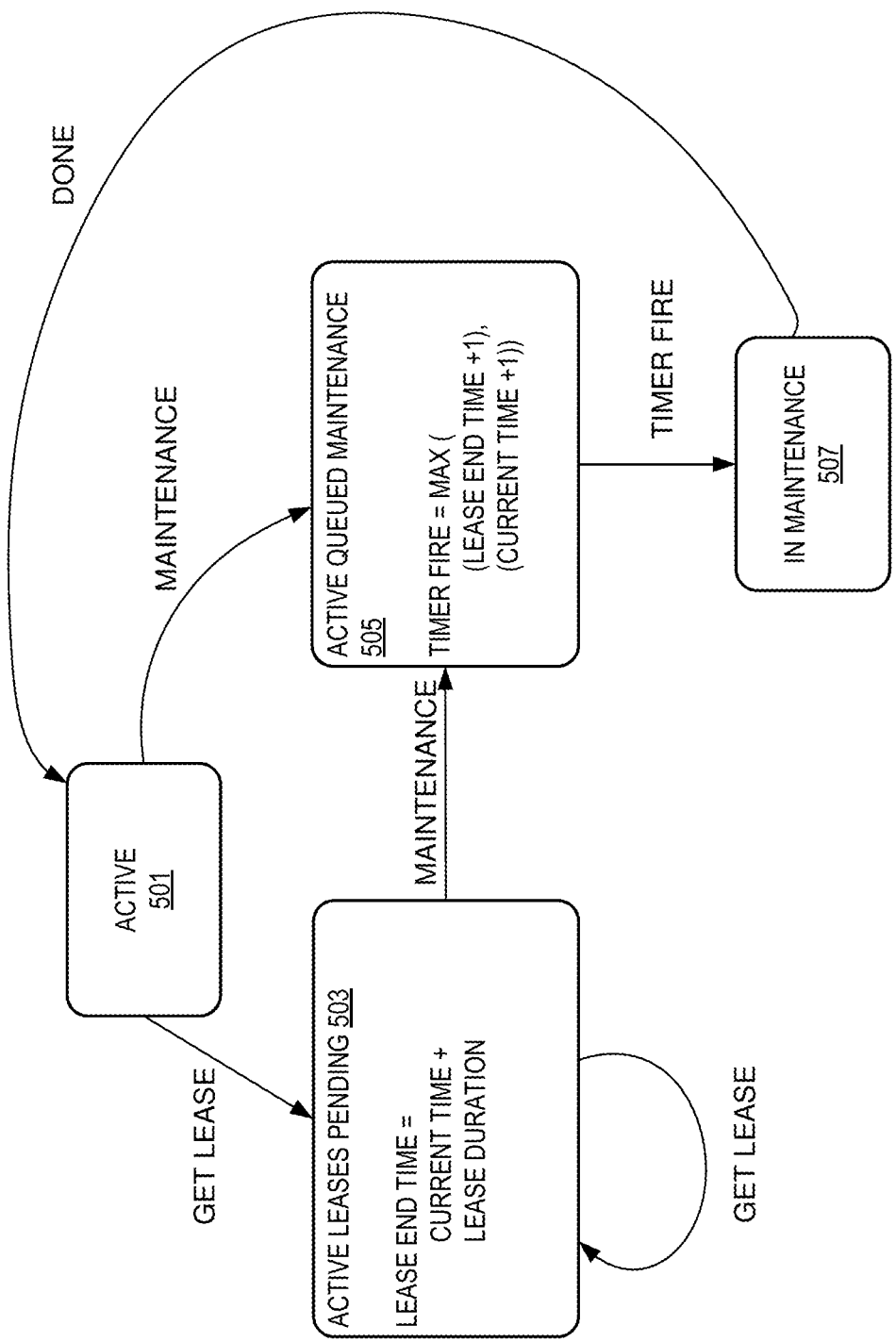
FIG. 5 illustrates embodiments of a state machine for peer leasing.

FIG. 5 illustrates embodiments of a state machine for peer leasing. As shown, there are four states: active 501, active leases pending 503, active queue maintenance 505, and in maintenance 507.

In the active state 501, the peer has provided no leases, but can provide leases. Upon receiving a get lease request from a host, the state machine transitions to the active leases pending state 503. In the active leases pending state 503 the peer determines if it has any leases to give. In some embodiments, a peer can only give out a set number of leases at any given point in time. The leases that are outstanding and end time are stored in a lease table as detailed above. In this example, when a lease is given the lease end time is set to the current time plus a lease duration. As noted above, the lease duration may be preset or provided in the request. A get lease request while in the active leases pending state 503 does not change state. However, the request may be denied for having too many leases or a desire to perform maintenance.

The desire to perform maintenance causes a state switch from either the active state 501 or the active leases pending state 503 to the active queue maintenance state 505. In the active queue maintenance state 505, the peer sets a timer to fire that sets the maximum amount of time to wait before entering the in maintenance state 507. In some embodiments, the timer is set to be the maximum of the lease end time of the newest lease plus some skew or the current time plus a skew (if there are no leases).

The peer performs maintenance in the in maintenance state 507 and once complete returns to the active state 501.

Figure 6:
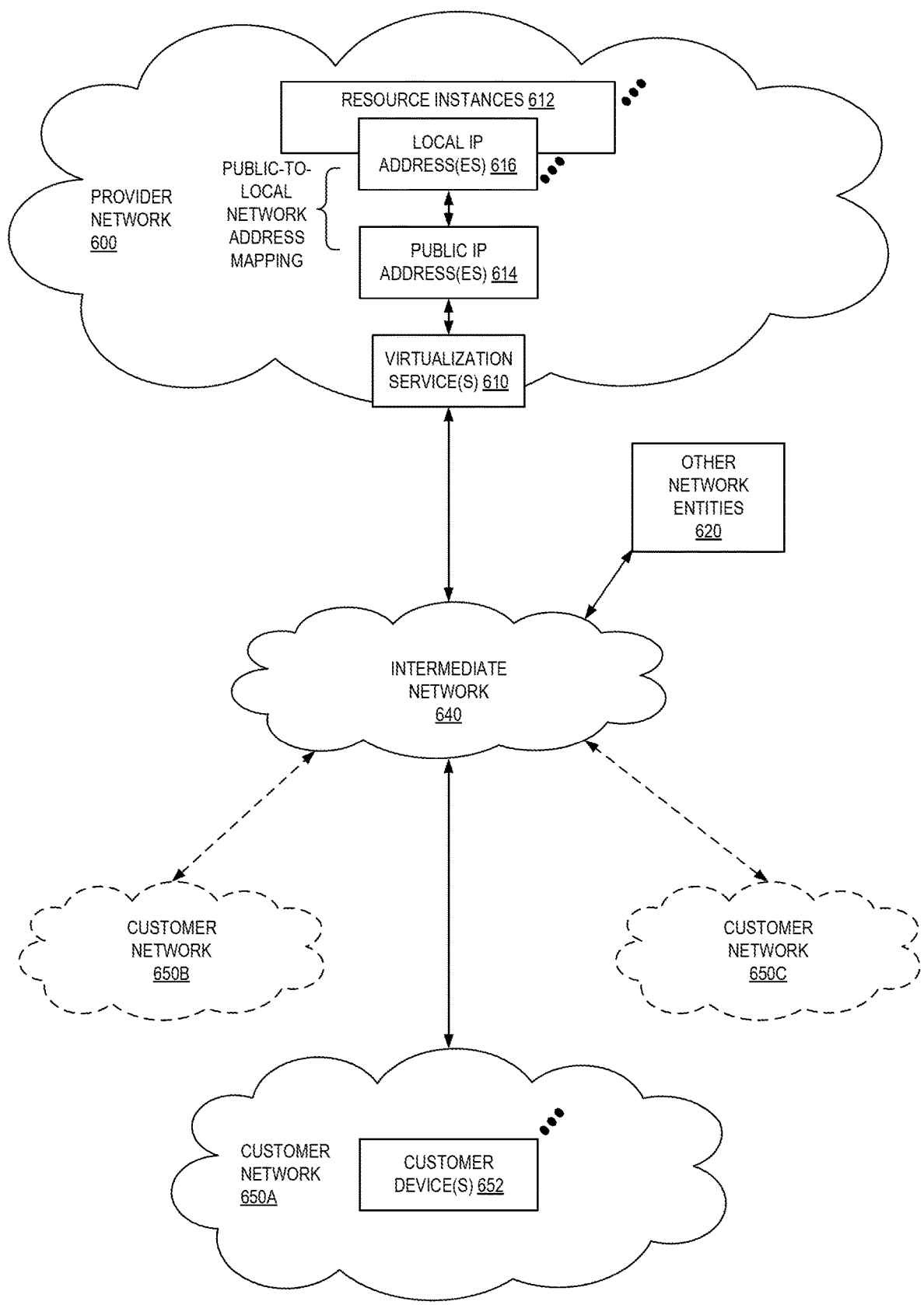
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
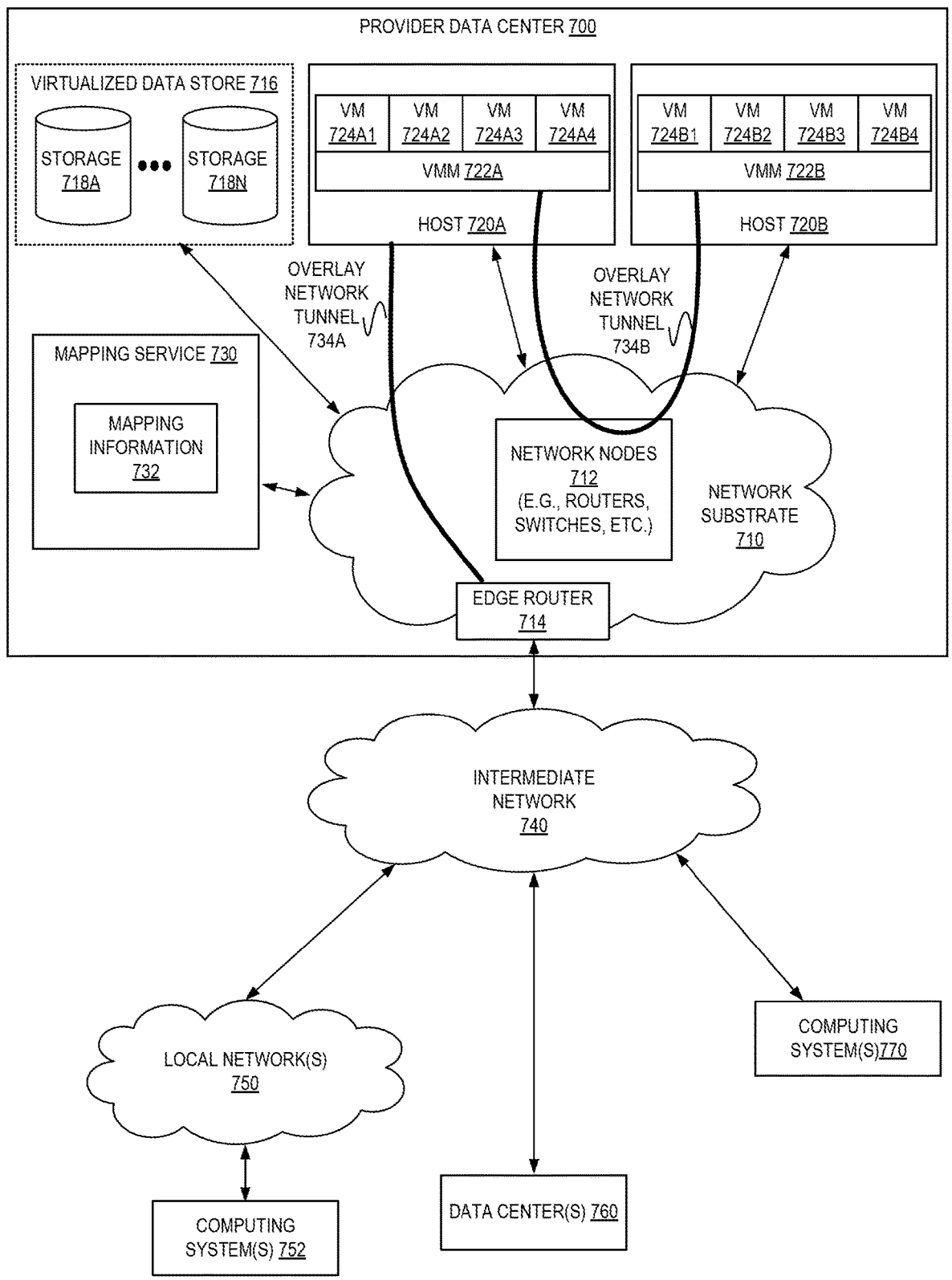
FIG. 7 illustrates an example data center that implements an overlay network on a network substrate using IP tunneling technology according to some embodiments.

FIG. 7 illustrates an example data center that implements an overlay network on a network substrate using IP tunneling technology, according to some embodiments. A provider data center 700 may include a network substrate that includes networking nodes 712 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 710 using tunnels. The IP tunneling technology may provide a mapping and encapsulating system for creating an overlay network on a network (e.g., a local network in data center 700 of FIG. 7) and may provide a separate namespace for the overlay layer (the public IP addresses) and the network substrate 710 layer (the local IP addresses). Packets in the overlay layer may be checked against a mapping directory (e.g., provided by mapping service 730) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 730) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 7, an example overlay network tunnel 734A from a virtual machine (VM) 724A (of VMs 724A1-724A4, via VMM 722A) on host 720A to a device on the intermediate network 750 and an example overlay network tunnel 734B between a VM 724A (of VMs 724A1-724A4, via VMM 722A) on host 720A and a VM 724B (of VMs 724B1-724B4, via VMM 722B) on host 720B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 7, at least some networks in which embodiments may be implemented may include hardware virtualization technology that enables multiple operating systems to run concurrently on a host computer (e.g., hosts 720A and 720B of FIG. 7), i.e. as virtual machines (VMs) 724 on the hosts 720. The VMs 724 may, for example, be executed in slots on the hosts 720 that are rented or leased to customers of a network provider. A hypervisor, or virtual machine monitor (VMM) 722, on a host 720 presents the VMs 724 on the host with a virtual platform and monitors the execution of the VMs 724. Each VM 724 may be provided with one or more local IP addresses; the VMM 722 on a host 720 may be aware of the local IP addresses of the VMs 724 on the host. A mapping service 730 may be aware of (e.g., via stored mapping information 732) network IP prefixes and IP addresses of routers or other devices serving IP addresses on the local network. This includes the IP addresses of the VMMs 722 serving multiple VMs 724. The mapping service 730 may be centralized, for example on a server system, or alternatively may be distributed among two or more server systems or other devices on the network. A network may, for example, use the mapping service technology and IP tunneling technology to, for example, route data packets between VMs 724 on different hosts 720 within the data center 700 network; note that an interior gateway protocol (IGP) may be used to exchange routing information within such a local network.

In addition, a network such as the provider data center 700 network (which is sometimes referred to as an autonomous system (AS)) may use the mapping service technology, IP tunneling technology, and routing service technology to route packets from the VMs 724 to Internet destinations, and from Internet sources to the VMs 724. Note that an external gateway protocol (EGP) or border gateway protocol (BGP) is typically used for Internet routing between sources and destinations on the Internet. FIG. 7 shows an example provider data center 700 implementing a network that provides resource virtualization technology and that provides full Internet access via edge router(s) 714 that connect to Internet transit providers, according to some embodiments. The provider data center 700 may, for example, provide customers the ability to implement virtual computing systems (VMs 724) via a hardware virtualization service and the ability to implement virtualized data stores 716 on storage resources 718A-718N via a storage virtualization service.

The data center 700 network may implement IP tunneling technology, mapping service technology, and a routing service technology to route traffic to and from virtualized resources, for example to route packets from the VMs 724 on hosts 720 in data center 700 to Internet destinations, and from Internet sources to the VMs 724. Internet sources and destinations may, for example, include computing systems 770 connected to the intermediate network 740 and computing systems 752 connected to local networks 750 that connect to the intermediate network 740 (e.g., via edge router(s) 714 that connect the network 750 to Internet transit providers). The provider data center 700 network may also route packets between resources in data center 700, for example from a VM 724 on a host 720 in data center 700 to other VMs 724 on the same host or on other hosts 720 in data center 700.

A service provider that provides data center 700 may also provide additional data center(s) 760 that include hardware virtualization technology similar to data center 700 and that may also be connected to intermediate network 740. Packets may be forwarded from data center 700 to other data centers 760, for example from a VM 724 on a host 720 in data center 700 to another VM on another host in another, similar data center 760, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 718A-718N, as virtualized resources to customers of a network provider in a similar manner.

Figure 8:
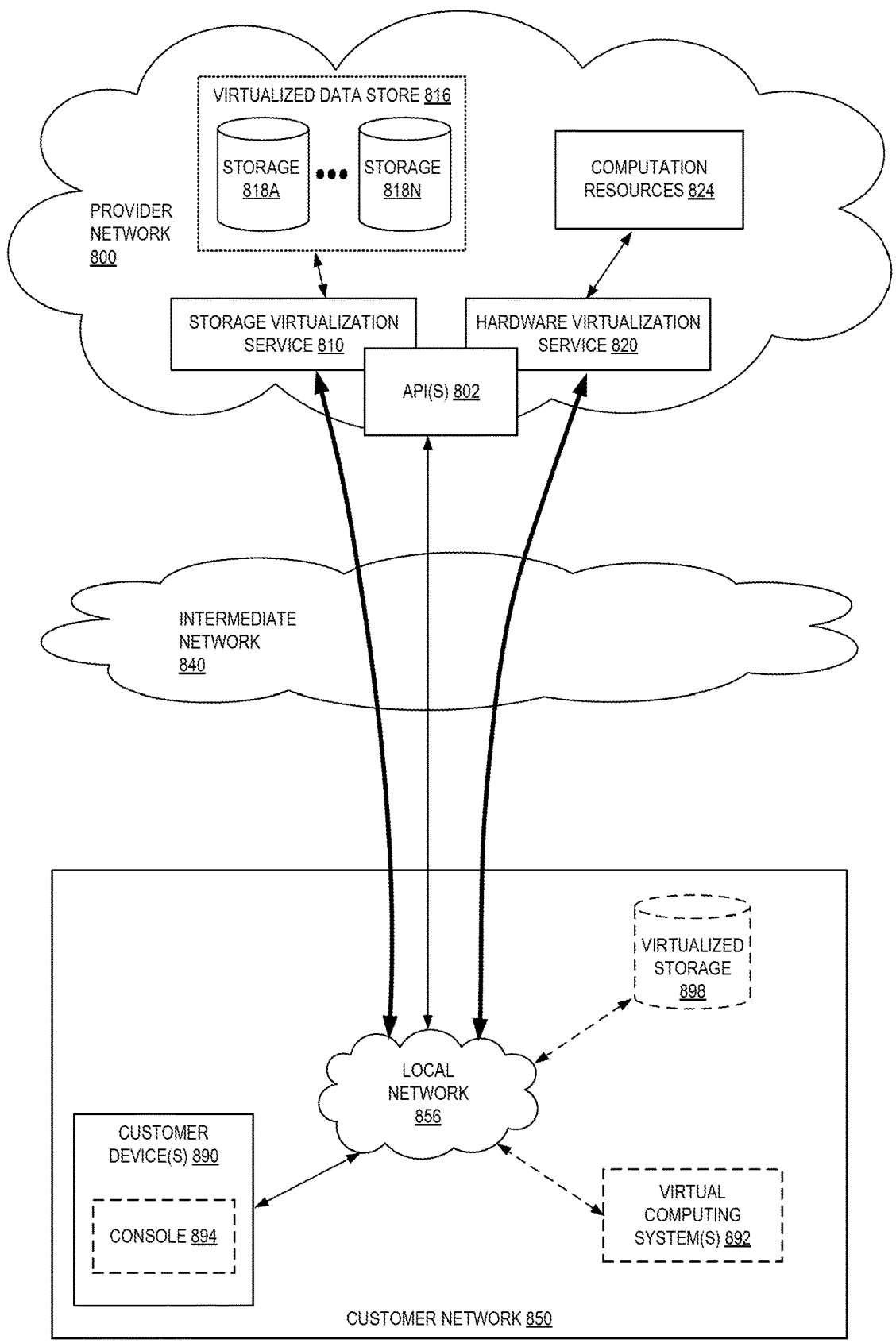
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800

(e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage virtualization service 810, for example via one or more APIs 802, to access data from and store data to storage resources 818A-818N of a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
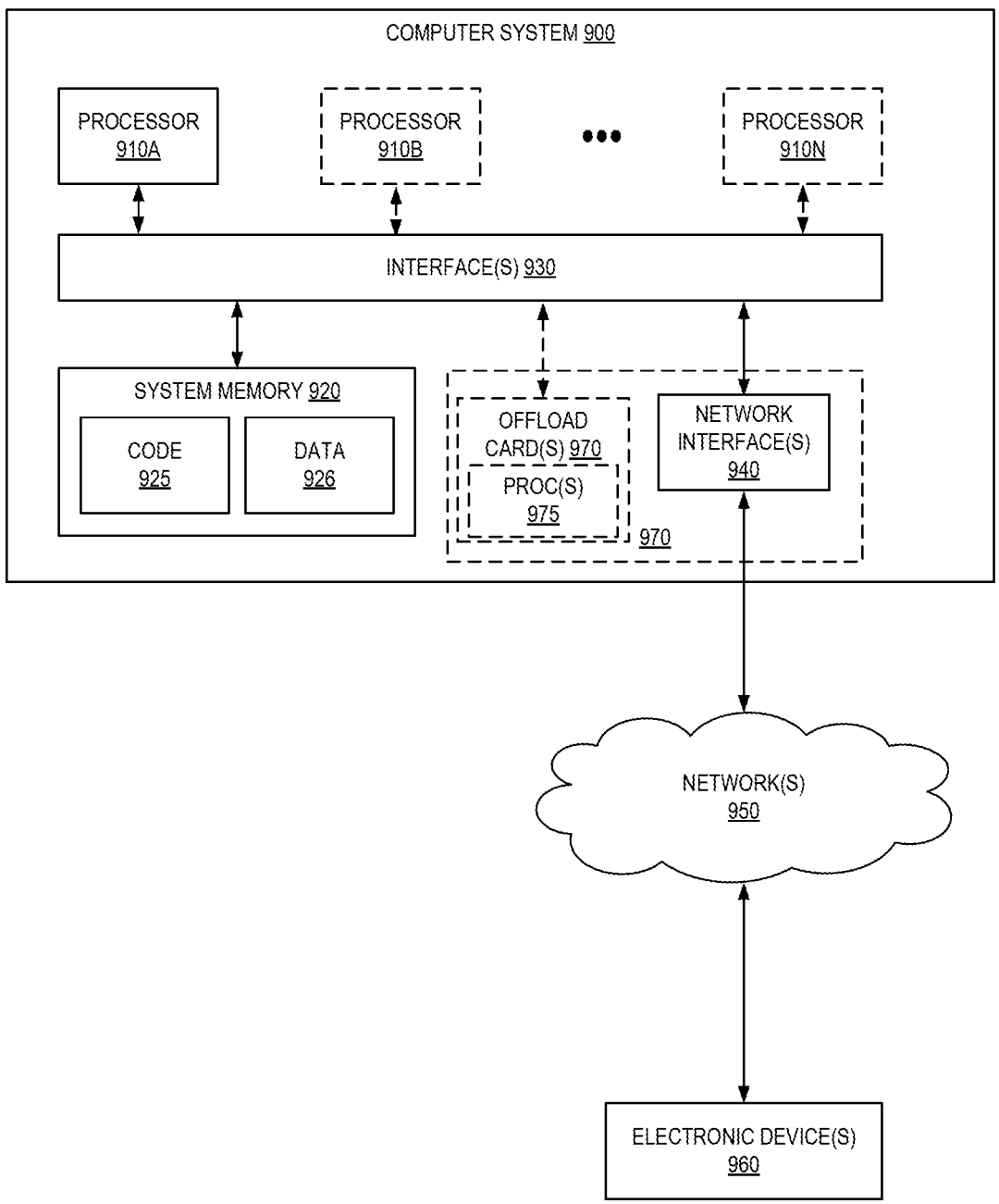
FIG. 9 is a block diagram illustrating an example computer system that may be used in some embodiments.

In some embodiments, a system that implements a portion or all of the techniques for peer leasing as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM) etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
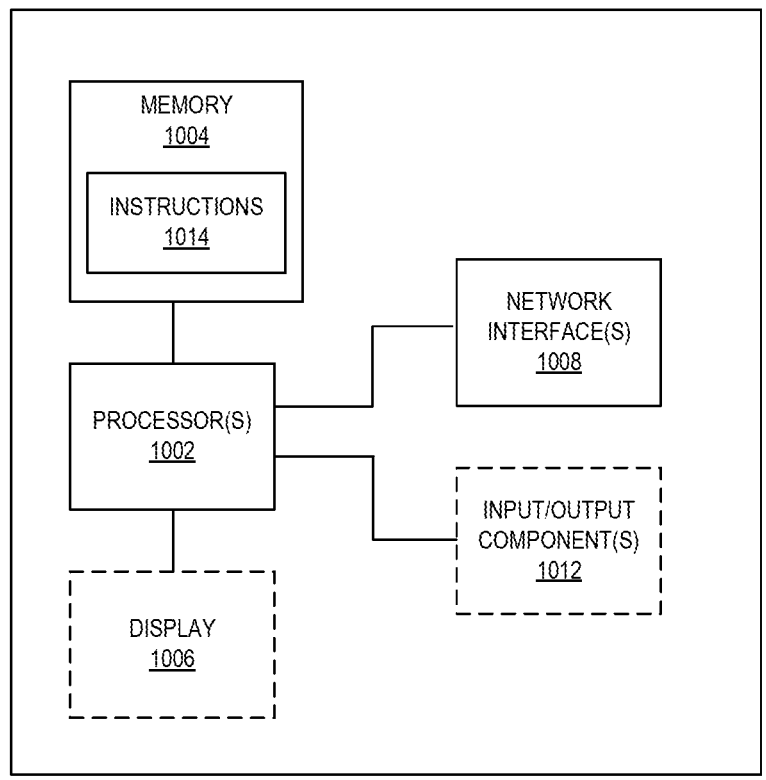
FIG. 10 illustrates a logical arrangement of a set of general components of an exemplary computing device that can be utilized in accordance with various embodiments.

FIG. 10 illustrates a logical arrangement of a set of general components of an example computing device 1000 such as a host or peer described above, etc. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (e.g., instructions 1014) and/or data, and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1014) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 11:
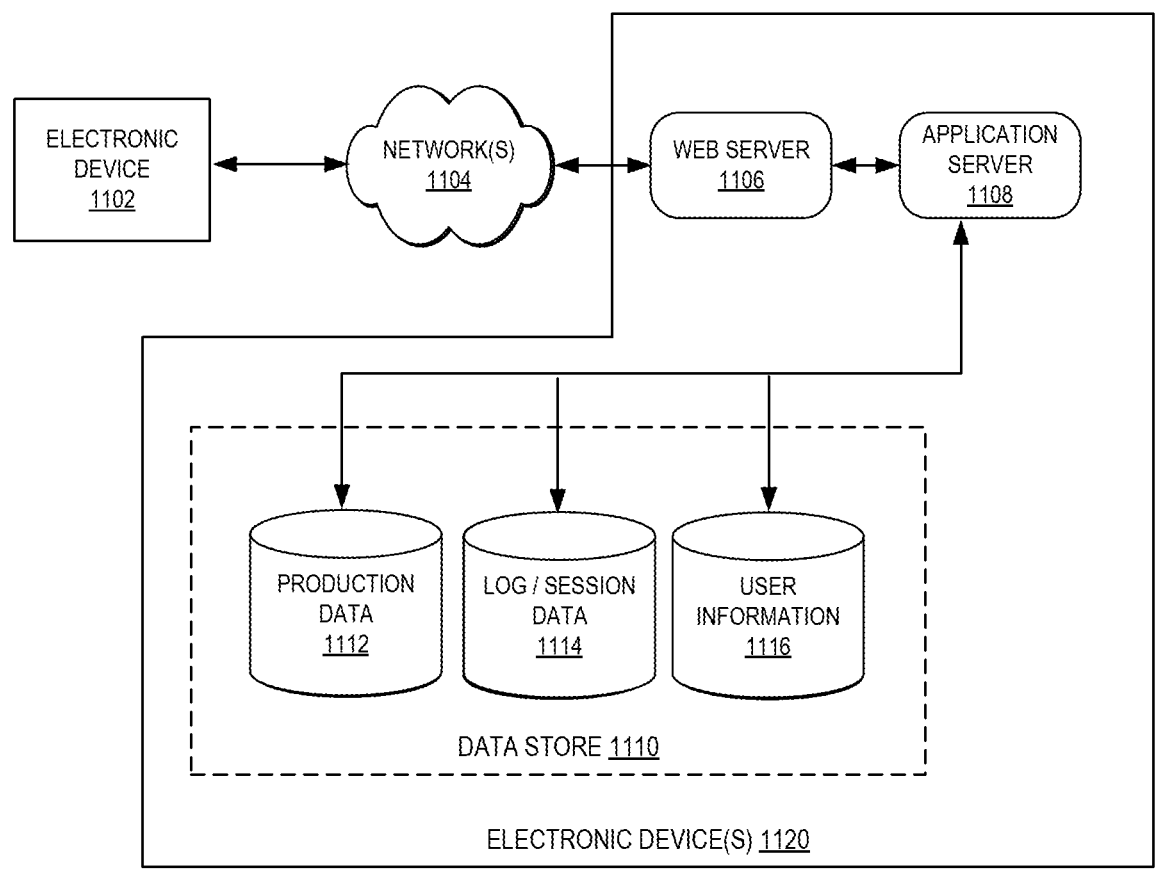
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments lease requests are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving error metrics regarding a host of a distributed system, wherein the error metrics include at least one of a number of errors over a period of time and an indication of an amount of requests that have failed;
receiving connectivity state information about the host with respect to storage nodes of the distributed system;
determining the host to be unhealthy based upon the received error metrics exceeding a threshold and connectivity state information;
based at least in part on determining the host of the distributed system to be unhealthy, requesting, for the host, a plurality of leases from peers in the distributed system, each lease to guarantee the lease providing peer will not undergo voluntary maintenance;
upon receiving the requested plurality of leases, reporting the host as unhealthy to a load balancer of the distributed system, the load balancer to balance traffic of the host and not direct traffic to the unhealthy host; and
reporting the host as healthy to the load balancer of the distributed system after a predetermined period of time.

2. The computer-implemented method of claim 1, wherein the host is determined to be unhealthy when it cannot meet its service level agreement.

3. The computer-implemented method of claim 1, wherein determining the host of the distributed system to be unhealthy is further based upon latency information.

4. The computer-implemented method of claim 1, wherein the plurality of leases are requested from random peers.

5. The computer-implemented method of claim 1, wherein a number of leases allowed per peer is limited.

6. The computer-implemented method of claim 1, further comprising:
maintaining a lease table at the host, the lease table to indicate, per lease, a lessee and end time for the lease.

7. The computer-implemented method of claim 1, wherein the host and peers are to maintain a state machine, the state machine having a plurality of states including a first state in which the peer is active, a second state in which leases are allowed, a third state in which no more leases are to be given out, and a fourth state for maintenance.

8. The computer-implemented method of claim 1, wherein a lease is to be denied when a number of leases granted by a peer exceeds a threshold over a period of time.

9. A system comprising:
a load balancer implemented by a first one or more electronic devices; and
a host implemented by a second one or more electronic devices, the host to:
receive error metrics regarding the host, wherein the error metrics include at least one of a number of errors over a period of time and an indication of an amount of requests that have failed,
receive connectivity state information about the host with respect to storage nodes of the system,
determine the host to be unhealthy based upon the received error metrics exceeding a threshold and connectivity state information,
based at least in part on determining the host to be unhealthy, request, for the host, a plurality of leases from peers in the system, each lease to guarantee the lease providing peer will not undergo voluntary maintenance,
upon receipt of the requested plurality of leases, report the host as unhealthy to the load balancer, the load balancer to balance traffic of the host and not direct traffic to the unhealthy host, and
report the host as healthy to the load balancer after a predetermined period of time.

10. The system of claim 9, wherein the host is determined to be unhealthy when it cannot meet its service level agreement.

11. The system of claim 9, wherein to determine the host of the system to be unhealthy is further based upon latency information.

12. The system of claim 9, wherein the plurality of leases are requested from random peers.

13. The system of claim 9, wherein a lease is to be denied when a number of leases granted by a peer exceeds a threshold over a period of time.

* * * * *